No. 832,979. PATENTED OCT. 9, 1906.
C. S. KELLOGG.
GARAGE.
APPLICATION FILED JULY 30, 1906.

2 SHEETS—SHEET 1.

WITNESSES: INVENTOR.
Charles Snow Kellogg,
By Daniel A. Carpenter,
HisATTORNEY

UNITED STATES PATENT OFFICE.

CHARLES SNOW KELLOGG, OF MONTCLAIR, NEW JERSEY.

GARAGE.

No. 832,979.  Specification of Letters Patent.  Patented Oct. 9, 1906.

Application filed July 30, 1906. Serial No. 328,444.

*To all whom it may concern:*

Be it known that I, CHARLES SNOW KELLOGG, a citizen of the United States, and a resident of Montclair, in the county of Essex and State of New Jersey, have invented a certain new and useful Improvement in the Construction of Garages, of which the following is a full, clear, and exact description, reference being made to the accompanying drawings, forming part of this specification.

This invention relates to improvements in the construction of garages containing many small rooms or compartments suitable to hold automobiles and in means to be used in moving automobiles to and from the compartments.

The invention consists of a garage in which rows of compartments, an elevator, and a carriage are combined, as will be hereinafter described.

Figure 1:
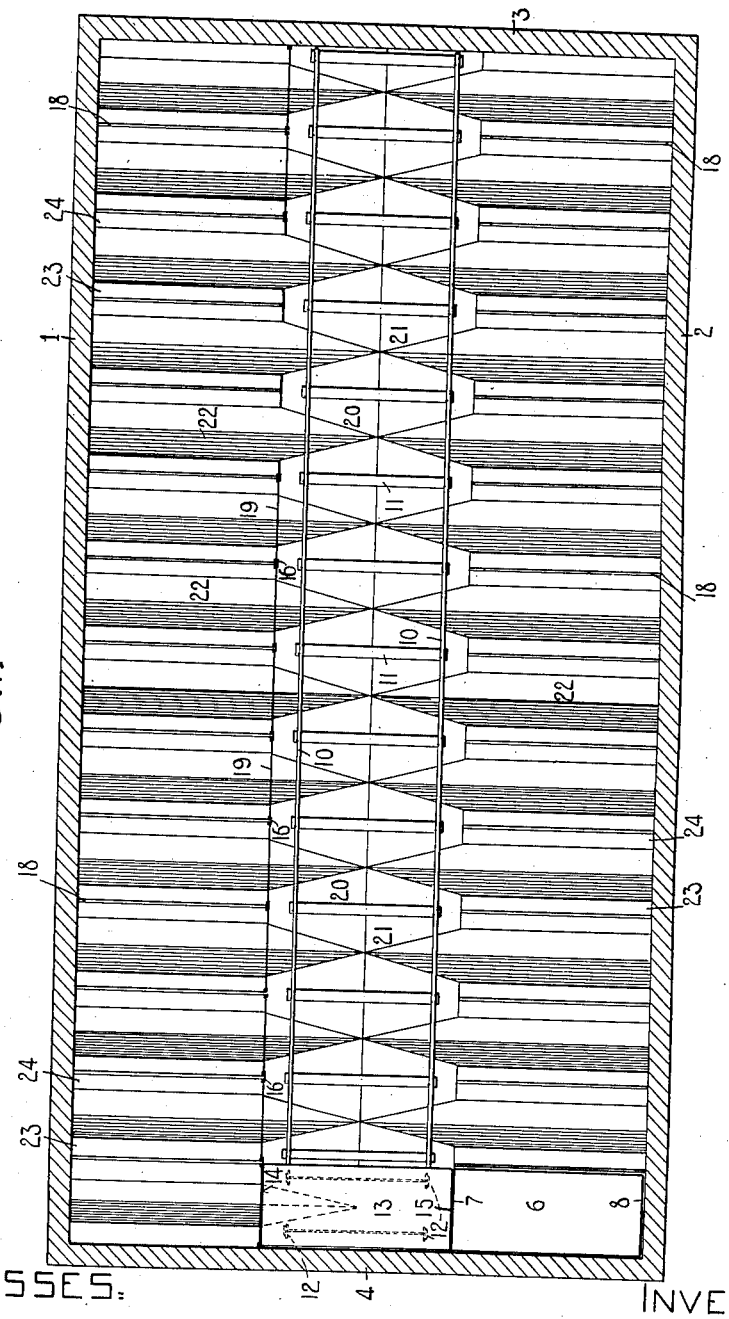
Figure 2:
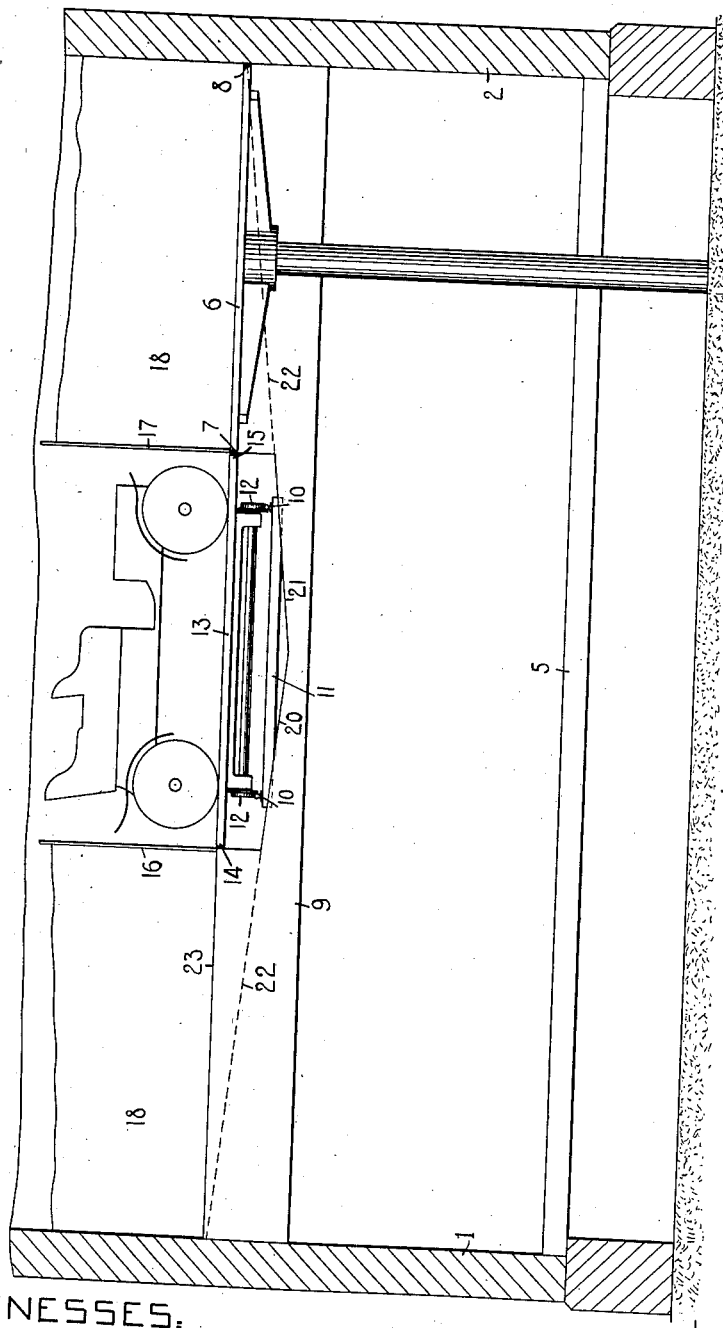

On the accompanying sheets of drawings, on which like reference-numerals designate like parts in different views, Figure 1 is a plan of one of the lofts of a garage embodying the invention, and Fig. 2 an end view of the interior of the first story and of the lower part of the loft immediately over it.

The main object of the invention is to render it feasible to so construct a garage that all of the floor of each story above the first except a strip about eighteen feet wide extending from end to end of the floor and space required for an elevator may be utilized for the storage of automobiles in small oblong compartments each affording room for one automobile only.

Another object is to enable automobiles to be conveyed from the first floor of the garage to the compartments above and thence back to the first floor by moving them only in straight directions, so that risk of injuring their steering mechanism may be avoided.

The invention is shown embodied in a garage which may be built on a lot about sixty feet wide, the sides 1 and 2 and ends 3 and 4 of the building being represented in Fig. 1 of the drawings. On the first floor 5 there may be an office, a space where automobiles may be allowed to stand for short periods just after they enter and before they leave the garage, and a place where they may be washed. Next to one of the side walls is an elevator 6, whose floor is preferably oblong, its shorter edges 7 and 8 being parallel to the walls 1 and 2. The elevator is shown in Fig. 2 with its floor even with a platform forming part of a truck which is on the second floor 9 of the building. A track comprising rails 10, which may be fastened to ties 11, lying on or embedded in the floor 9 or which may be otherwise attached to the floor, extends from end to end of the building, the rails 10 being on opposite sides of and equally distant from a plane which is parallel to the walls 1 and 2 and which cuts the walls 3 and 4 midway between their ends. The wheels 12 of the truck, which are flanged like common car-wheels, are mounted on the rails 10, and the truck is movable along the track. The platform 13 of the truck is preferably about eight feet wide and at least eighteen feet long, its ends 14 and 15 being parallel to the walls 1 and 2. These dimensions are such that a large automobile may stand on the platform without projecting over its edge on either side or at either end.

Each of the oblong compartments is preferably about eight feet wide and from eighteen to twenty feet long. One end of each compartment is formed by one of the side walls of the building and the other end by a partition 16 or 17. These partitions are close to vertical planes containing the edges 14 and 15 of the platform 13, so that between the partitions 16 and 17 a passage eighteen feet wide is provided, from which access may be had to each compartment of either row. One side wall of each corner-compartment is an end wall of the building, its other side wall being a partition 18, and both side walls of each of the other compartments are partitions 18. In that end of each compartment which is next to the passage is a vertically-sliding door 19, although the doors in the partition 17 and some of those in the partition 16 are not shown.

The floor of the passage slopes from the partitions 16 and 17, its surfaces 20 and 21 forming a shallow channel which extends from end to end of the building under the track and which is lower at one end than at the other, and in the floor of each compartment is a channel 22, extending the whole length of the compartment and communicating with the main channel in the floor of the passage. The bed of each of the channels 22 descends from the back of the compartment to the main channel, as indicated by dotted lines in Fig. 2, so that liquid will flow in it from end to end and be discharged into the main channel. The floor of each compartment comprises surfaces 23 and 24, which are level with the top of the platform of the truck and each of which is about two feet wide. The bed of the main channel and the floors of the compartments, including the beds of the channels 22, may be made of suitable plastic material—such as concrete, for example. The lower end of the main channel may be connected with a sewer or a tank.

Immediately after an automobile which has been in use enters the garage it will be washed and then taken to the compartment assigned to it. It will be pushed on the elevator from the main floor, raised by means of the elevator until its floor is at the level of the floor of the compartment and of the platform of the truck, pushed from the elevator on the truck, moved with and on the truck to the door of the compartment, unless the compartment is directly opposite the elevator-shaft, and pushed from the truck into the compartment. If the compartment is directly opposite the elevator-shaft, the automobile will be pushed from the elevator across the platform of the truck into the compartment, it being unnecessary in this case to move the truck away from the elevator. All this will be done without subjecting the steering mechanism to any injurious strain, for the machine will be turned only on the main floor, where there is plenty of room. It is obvious that by reversing the series of acts above described an automobile may be taken from any compartment to the main floor.

The wheels of the automobile will stand on the surfaces 23 and 24 of the compartment-floor, and oil which drips from the machinery will fall into the channel 22. Water dripping from the wheels and sides of the vehicle will fall on the surfaces 23 and 24 and tend to keep them clean. If a strip of the main floor connecting the elevator with the place where the automobiles are washed, and the floor of the elevator and the platform of the truck are kept clean, as they easily may be by allowing water to flow on them occasionally, the tires of the machines will not get spattered or smeared with oil after the machines are washed or while they are standing in the compartments. It is proposed to lock the doors of the compartments and to allow an automobile to be taken out of its compartment only when it is called for by its owner, or a person authorized by him to get it, and to keep it in condition to be put into use at a moment's notice. The automobiles may be washed in the compartments as well as on the main floor of the garage.

It will be seen that large automobiles, which are about seventeen feet long, could not be pushed or drawn endwise along a passage equal in width to the passage shown and described and turned from it into one of the compartments, and that consequently this invention enables a much larger part of the floor of a building to be utilized for the storage of automobiles than it has heretofore been feasible to devote to that use. This is an important consideration in large cities, where the expense of maintaining a garage depends greatly on the size of the plot on which the building stands.

A garage containing the invention may include two or more lofts each constructed like that which has been described and having in the passage a truck or carriage to be operated in connection with the elevator for conveying automobiles to and from the compartments of each row. Although the elevator-shaft is shown in one corner of the building, it might be in a different location, between the ends of either row of compartments. A carriage differing in form from the truck shown and described might be substituted for this truck, and some kind of driving mechanism might be connected to the carriage. Various other features of the structure and apparatus shown and described may be changed, and some of them may be omitted without affecting the invention which is herein claimed.

Having thus described my invention, what I claim as new, and desire to secure by Letters Patent, is—

1. In a garage the combination of compartments arranged in two rows with a passage extending between and from end to end of said rows, an elevator affording access to the passage from one side thereof, and a carriage including a platform extending across the passage, the carriage being movable from end to end of the passage and affording means for conveying automobiles from the elevator to the compartments of both rows.

2. In a garage the combination of oblong compartments arranged in two rows with a passage extending between and from end to end of said rows, one end of each compartment being next to said passage, an elevator affording access to the passage, and a carriage including a platform extending across the passage, the carriage being movable from end to end of the passage and affording means for conveying automobiles from the elevator to the compartments of both rows.

3. In a garage the combination of oblong compartments arranged in two rows with a passage extending between and from end to end of said rows, one end of each compartment being next to said passage, an elevator affording access to the passage, and a carriage including an oblong platform whose length nearly equals the width of the passage and whose width is substantially that of one of the compartments, the carriage being movable from end to end of the passage and affording means for conveying automobiles from the elevator to the compartments of both rows.

4. In a garage the combination of oblong compartments arranged in two rows with a passage extending between and from end to end of said rows, one end of each compartment being next to said passage, an elevator affording access to the passage from one side thereof, the floor of the elevator being oblong and one of its ends being next to the passage, and a carriage including an oblong platform whose length nearly equals the width of the passage and whose width is substantially that of one of the compartments, the carriage being movable from end to end of the passage and affording means for conveying automobiles from the elevator to the compartments of both rows.

CHAS. SNOW KELLOGG.

In presence of—
 JOHN B. ELMENDORF,
 EDW. O. KANNOFSKY.